United States Patent
Zhao et al.

(10) Patent No.: US 12,509,372 B1
(45) Date of Patent: Dec. 30, 2025

(54) METHOD AND SYSTEM FOR CONTROLLING SALT CHLORINE GENERATION AND SALT CHLORINE GENERATOR

(71) Applicant: QI AUTOMOTIVE CO., LTD., Qingdao (CN)

(72) Inventors: Han Zhao, Qingdao (CN); Zhenchao Li, Qingdao (CN); Xiuzhong Yang, Qingdao (CN); Dekai Pan, Qingdao (CN); Shouyong Sun, Qingdao (CN)

(73) Assignee: QI AUTOMOTIVE CO., LTD., Qingdao (CN)

( * ) Notice: Subject to any disclaimer, the term of this patent is extended or adjusted under 35 U.S.C. 154(b) by 0 days.

(21) Appl. No.: 19/056,917

(22) Filed: Feb. 19, 2025

(30) Foreign Application Priority Data

Dec. 9, 2024 (CN) .......................... 202411801423.3

(51) Int. Cl.
| | | |
|---|---|---|
| *C02F 1/467* | (2023.01) | |
| *C02F 1/00* | (2023.01) | |
| *C02F 1/461* | (2023.01) | |

(52) U.S. Cl.
CPC ............ *C02F 1/4674* (2013.01); *C02F 1/001* (2013.01); *C02F 1/008* (2013.01); *C02F 1/46104* (2013.01); *C02F 2201/46125* (2013.01); *C02F 2201/46145* (2013.01); *C02F 2201/4615* (2013.01); *C02F 2209/03* (2013.01); *C02F 2209/04* (2013.01); *C02F 2209/29* (2013.01); *C02F 2209/40* (2013.01); *C02F 2303/04* (2013.01)

(58) Field of Classification Search
CPC ........ C02F 1/4674; C02F 1/001; C02F 1/008; C02F 1/46104; C02F 2201/46125; C02F 2201/46145; C02F 2201/4615; C02F 2209/03; C02F 2209/04; C02F 2209/29; C02F 2209/40; C02F 2303/04
See application file for complete search history.

(56) References Cited

FOREIGN PATENT DOCUMENTS

| CN | 102050509 A | 5/2011 |
|---|---|---|
| CN | 114717603 A | 7/2022 |
| CN | 116102137 A | 5/2023 |

(Continued)

*Primary Examiner* — Terry K Cecil
(74) *Attorney, Agent, or Firm* — IPro, PLLC; Na Xu

(57) ABSTRACT

The present invention provides a method and system for controlling salt chlorine generation and a salt chlorine generator. The method includes: obtaining a water quality parameter and climate data; determining, according to the water quality parameter, whether a concentration of a chlorine disinfection constituent in water meets a standard; and if the concentration meets the standard, skipping starting an electrolysis apparatus/procedure; or if the concentration does not meet the standard, starting the electrolysis apparatus/procedure, and calculating a power supply time of the electrolysis apparatus according to a concentration difference value of the chlorine disinfection constituent, to form a control instruction; and determining a weighting value according to the climate data, to fine-tune the control instruction; and controlling the electrolysis apparatus by using the fine-tuned control instruction. The present invention can greatly extend the service life of the salt chlorine generator.

15 Claims, 4 Drawing Sheets

(56) References Cited

FOREIGN PATENT DOCUMENTS

| | | | |
|---|---|---|---|
| JP | S56158186 A | 12/1981 | |
| KR | 20060056079 A | 5/2006 | |
| WO | WO-2012159157 A1 * | 11/2012 | .............. C02F 1/008 |

* cited by examiner

FIG.1 - --Prior Art--

METHOD AND SYSTEM FOR CONTROLLING SALT CHLORINE GENERATION AND SALT CHLORINE GENERATOR

CROSS-REFERENCE TO RELATED APPLICATIONS

The present invention claims priority to Chinese Patent Application No. 202411801423.3, filed with China National Intellectual Property Administration on Dec. 9, 2024 and entitled "METHOD AND SYSTEM FOR CONTROLLING SALT CHLORINE GENERATION AND SALT CHLORINE GENERATOR", which is incorporated herein by reference in its entirety and constitutes a part of the present invention, and is used for all purposes.

TECHNICAL FIELD

The present invention relates to the field of salt chlorine generation technologies, and specifically to a method and system for controlling salt chlorine generation and a salt chlorine generator.

BACKGROUND

The description in this section merely provides background information related to the present invention and does not necessarily constitute the prior art.

A salt chlorine generator is a device that disinfects water by using an electrolysis principle, mainly electrolyzes salt water to generate sodium hypochlorite for killing germs, algae, and pollutants in water, and is widely used in the field of swimming pool water treatment. A complete salt chlorine generator usually includes a power supply, a controller, an electrolysis apparatus, and a water flow sensor. To operate normally, the salt chlorine generator usually further requires a water circulation pipe and a circulating water pump. After the circulating water pump operates, water in a swimming pool flows from the pipe to the electrolysis apparatus for electrolysis to generate a chlorine disinfection constituent. In a process of use, a user directly dissolves salt in pool water, and the electrolysis apparatus is linked to a pipe for circulating water. When the circulating water pump operates, water is delivered into a water inlet of the electrolysis apparatus. After being treated by the electrolysis apparatus, the water then flows out through a water outlet. The salt chlorine generator outputs a particular voltage to the electrolysis apparatus through the controller. The electrolysis apparatus performs electrolysis to generate the chlorine disinfection constituent, thereby killing germs and pollutants in the pool water.

An optimal operating state of the salt chlorine generator is maintained under the following conditions: A rated salt concentration needs to be maintained, an appropriate voltage is provided, and an electrolysis plate in the electrolysis apparatus further needs to operate at an appropriate temperature, or otherwise, the service life of the electrolysis plate is reduced.

Therefore, an existing salt chlorine generator usually has the following disadvantages.

A potential security risk exists. A particular water flow rate needs to be maintained in the electrolysis apparatus when the salt chlorine generator operates. This parameter has a limited range with upper and lower limits. When the user configures a water pump for a swimming pool, a water pump with a larger rated flow rate is generally configured, and a particular allowance is reserved. When a filter apparatus in a circulating water pipe is slightly clogged after long-time use, the user does not necessarily perform check within a short time. A water pressure in the circulating water pipe increases, and potential problems such as bursting of the water pipe and damage to the electrolysis apparatus may exist.

The flow rate through the salt chlorine generator cannot be accurately regulated, and the user regulates the flow rate by regulating the circulating water pump. As shown in FIG. 1, in an installation environment with a water diversion pipe, a flow rate through the electrolysis apparatus cannot be ensured, and an excessively large or excessively small water flow rate causes low efficiency of the electrolysis apparatus.

To maintain good water quality for a swimming pool, water quality parameters in water need to meet a particular standard. Currently, the user in the salt chlorine generator may independently install some sensor systems related to water quality, to observe various parameters of water in a swimming pool. The user needs to laboriously view these complex water quality parameters, and regulate a service condition of the salt chlorine generator according to the water quality parameters, leading to high difficulty in use and maintenance and very high learning costs for the user.

The decomposition speed of the chlorine disinfection constituent generated by the salt chlorine generator through electrolysis is fast in a case of a strong sunshine intensity or ultraviolet intensity, and is slow in a case of a weak sunshine intensity or ultraviolet intensity. Currently, a running time of a part of the electrolysis apparatus of the salt chlorine generator is wasted, which reduces the effective service life of the salt chlorine generator.

In some salt chlorine systems, a salt chlorine generator is not provided with a filter apparatus. In some swimming pool disinfection systems, a user installs no dedicated swimming pool filter apparatus. As a result, circulating water flowing through the salt chlorine generator may carry particle impurities such as grit. These impurities may scratch the electrolysis plate when passing through the electrolysis apparatus, and as a result the electrolysis apparatus fails prematurely.

Replacement costs are high for individual damaged devices in a salt chlorine system. The replacement of parts involves the reinstallation of the devices and the rearrangement of cables, causing great difficulty and high costs.

SUMMARY

To solve the foregoing problems, the present invention provides a method and system for controlling salt chlorine generation and a salt chlorine generator. In the present invention, a pressure and clogging in a pipe are determined based on a water pressure and a flow rate parameter. When an anomaly occurs, an alarm is set off in time, or even a flow rate of a circulating water pump is controlled, thereby ensuring the safety and service life of a water circulation pipeline and a salt chlorine generator. A flow rate of water that flows inside an electrolysis apparatus may be determined and regulated to an optimal flow rate state, thereby ensuring maximum electrolysis efficiency and extending the service life of the electrolysis apparatus. A running time of the electrolysis apparatus is flexibly adjusted through a water quality parameter and a climate parameter, thereby increasing an effective electrolysis time of the electrolysis apparatus of the salt chlorine generator, reducing an ineffective running time, and further extending the service life of the electrolysis apparatus.

According to some embodiments, the present invention adopts the following technical solutions.

A method for controlling salt chlorine generation, including:

obtaining a water quality parameter and climate data;

determining, according to the water quality parameter, whether a concentration of a chlorine disinfection constituent in water meets a standard; and if the concentration meets the standard, skipping starting an electrolysis apparatus/procedure; or if the concentration does not meet the standard, starting the electrolysis apparatus/procedure, and calculating a power supply time of the electrolysis apparatus according to a concentration difference value of the chlorine disinfection constituent, to form a control instruction;

determining a weighting value according to the climate data, to fine-tune the control instruction; and controlling the electrolysis apparatus by using the fine-tuned control instruction.

In an alternative implementation mode, the water quality parameter includes a water oxidation-reduction potential measured value.

In an alternative implementation mode, the climate data includes a sunshine intensity and an ultraviolet index.

In an alternative implementation mode, a specific process of determining, according to the water quality parameter, whether a concentration of a chlorine disinfection constituent in water meets a standard includes: obtaining a water oxidation-reduction potential measured value of a swimming pool according to an ORP (Oxidation-Reduction Potential) sensor in a system, comparing the measured value with a preset threshold, and determining, if the measured value is less than the threshold, that the concentration of the chlorine disinfection constituent in the water does not meet the standard.

In an alternative implementation mode, a process of calculating a power supply time of the electrolysis apparatus according to a concentration difference value of the chlorine disinfection constituent includes: within each power supply cycle, the power supply time t of the electrolysis apparatus is $N*\Delta_{concentration}/m$, where N is a total duration of the power supply cycle, m is a preset parameter less than N, and $\Delta_{concentration}$ is the concentration difference value of the chlorine disinfection constituent.

In an alternative implementation mode, a specific process of determining a weighting value according to the climate data includes: comprehensively processing a sunshine intensity and an ultraviolet index, where the obtained weighting value is classified into a plurality of levels, and adding a weight within a set range to the power supply time corresponding to the control instruction.

In a further limited embodiment, the set range is [1.0, . . . , 1.a], a is greater than 0, a quantity of the levels is b, the set range is divided at intervals of (a+1)/10b, and a weight of an $i^{th}$ level is 1.0+(a+1)(i−1)/10b.

In an alternative implementation mode, the concentration of the chlorine disinfection constituent is periodically obtained, and when the concentration difference value $\Delta_{concentration}$ of the chlorine disinfection constituent is zero, the concentration of the chlorine disinfection constituent meets the standard, and the electrolysis apparatus is stopped.

A system for controlling salt chlorine generation, including:

a data obtaining module, configured to obtain a water quality parameter and climate data;

a control module, configured to determine, according to the water quality parameter, whether a concentration of a chlorine disinfection constituent in water meets a standard; and if the concentration meets the standard, skip starting an electrolysis apparatus/procedure; or if the concentration does not meet the standard, start the electrolysis apparatus/procedure, and calculate a power supply time of the electrolysis apparatus according to a concentration difference value of the chlorine disinfection constituent, to form a control instruction;

a weighting module, configured to determine a weighting value according to the climate data, to fine-tune the control instruction; and an execution module, configured to control the electrolysis apparatus by using the fine-tuned control instruction.

A salt chlorine generator includes the foregoing control system or is controlled by using the foregoing control method.

In an alternative implementation mode, the salt chlorine generator further includes a detection assembly, and the detection assembly includes several of the following modules:

a pressure sensor, configured to detect a pressure of liquid;

a pH sensor, configured to detect a pH value of liquid;

an ORP sensor, configured to detect an oxidation-reduction potential of liquid;

a total alkalinity sensor, configured to detect total alkalinity of liquid;

a calcium ion sensor, configured to detect calcium ions in liquid;

a water temperature sensor, configured to detect a temperature of liquid; and a flow rate sensor, configured to detect a flow rate of liquid.

In a further embodiment, a front end and a rear end of the salt chlorine generator are respectively connected to a pipe by interfaces, and at an inlet of the connected pipe, a filter mesh is disposed, and an electric control valve is disposed, to control an opening degree of the pipe, and water flows through an electrolysis apparatus for electrolysis and flows out from an water outlet to deliver a chlorine disinfection constituent into the pipe.

In a further embodiment, the salt chlorine generator further includes a controller, the controller is configured to compare a detected pressure of liquid with a preset upper pressure limit and lower pressure limit, if the pressure of liquid is greater than the preset upper pressure limit, the opening degree of the electric control valve is reduced, if the pressure is less than the preset lower pressure limit, the opening degree of the electric control valve is increased, and if the opening degree of the electric control valve already reaches a maximum but the pressure is still less than the preset lower pressure limit, early-warning information is sent to indicate that power of a circulating water pump in the pipe is to be increased; and the controller is connected to the detection assembly and an interaction module.

Compared with the prior art, the beneficial effects of the present invention are as follows:

The salt chlorine generator in the present invention obtains a water quality parameter, automatically controls a running duration of the electrolysis apparatus according to the water quality parameter, and automatically regulates a running time of the electrolysis apparatus according to data such as weather data that affects an electrolysis process and according to a sunshine intensity and an ultraviolet intensity, so that the service life of the salt chlorine generator can be greatly extended. The water quality parameter may further be notified to a user in a manner of a sound and light alarm, a touch screen display, or a wireless terminal, thereby avoiding frequent testing and debugging of the user, thereby greatly improving user experience.

The salt chlorine generator in the present invention can filter out fine grit in circulating water at a water inlet, and protects the subsequent sensors and electrolysis apparatus from scratching and damage, thereby extending the service life of the salt chlorine generator.

The salt chlorine generator of the present invention can determine a flow rate of water that flows inside the electrolysis apparatus, and regulate the flow rate to an optimal flow rate state by controlling a proportional control valve, thereby ensuring maximum electrolysis efficiency; and may detect clogging in the pipe, control a water pressure in a pipeline to be within an appropriate range, and notify the water pressure to the user in a manner of a sound and light alarm, the touch screen display, or a wireless terminal, thereby improving the safety of the pipeline and the service life of components.

The salt chlorine generator in the present invention is relatively independent of a water circulation pipeline system of a swimming pool, has only two interfaces for connection, is connected to the utility power by a power cable and wirelessly connected to a mobile phone of the user, and runs automatically without various signal lines and cables, so that mounting is convenient, and maintenance is simple.

The present invention has wide applications, and may be used for water quality maintenance and disinfection of a home or commercial swimming pool, to meet cyclic electrolysis and disinfection requirements for swimming pool water, avoid growth of bacteria and algae, meet water quality testing requirement of the user, and also provide characteristics such as simple operation and convenient installation and maintenance.

To make the foregoing objectives, features, and advantages in the present invention clearer and more comprehensible, detailed description is provided below with reference to preferred embodiments in conjunction with the accompanying drawings.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

The present invention is further described below with reference to the accompanying drawings and examples.

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present disclosure belongs.

It should be noted that the terms used herein are merely used for describing specific implementations, and are not intended to limit exemplary implementations of the present disclosure. As used herein, the singular form is intended to include the plural form, unless the context clearly indicates otherwise. In addition, it should further be understood that terms "include" and/or "including" used in this specification indicate that there are features, steps, operations, devices, components, and/or combinations thereof.

The examples in the present application and the features in the examples may be combined with each other without causing any conflict.

Example 1

Figure 1:
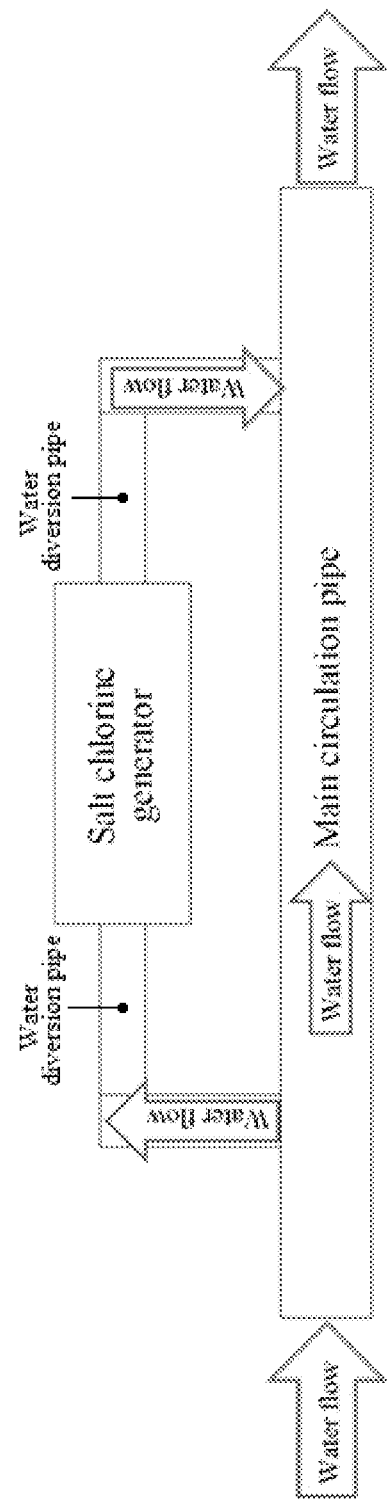
FIG. 1 is a schematic diagram of installation at a water diversion pipe in the prior art.
Figure 2:
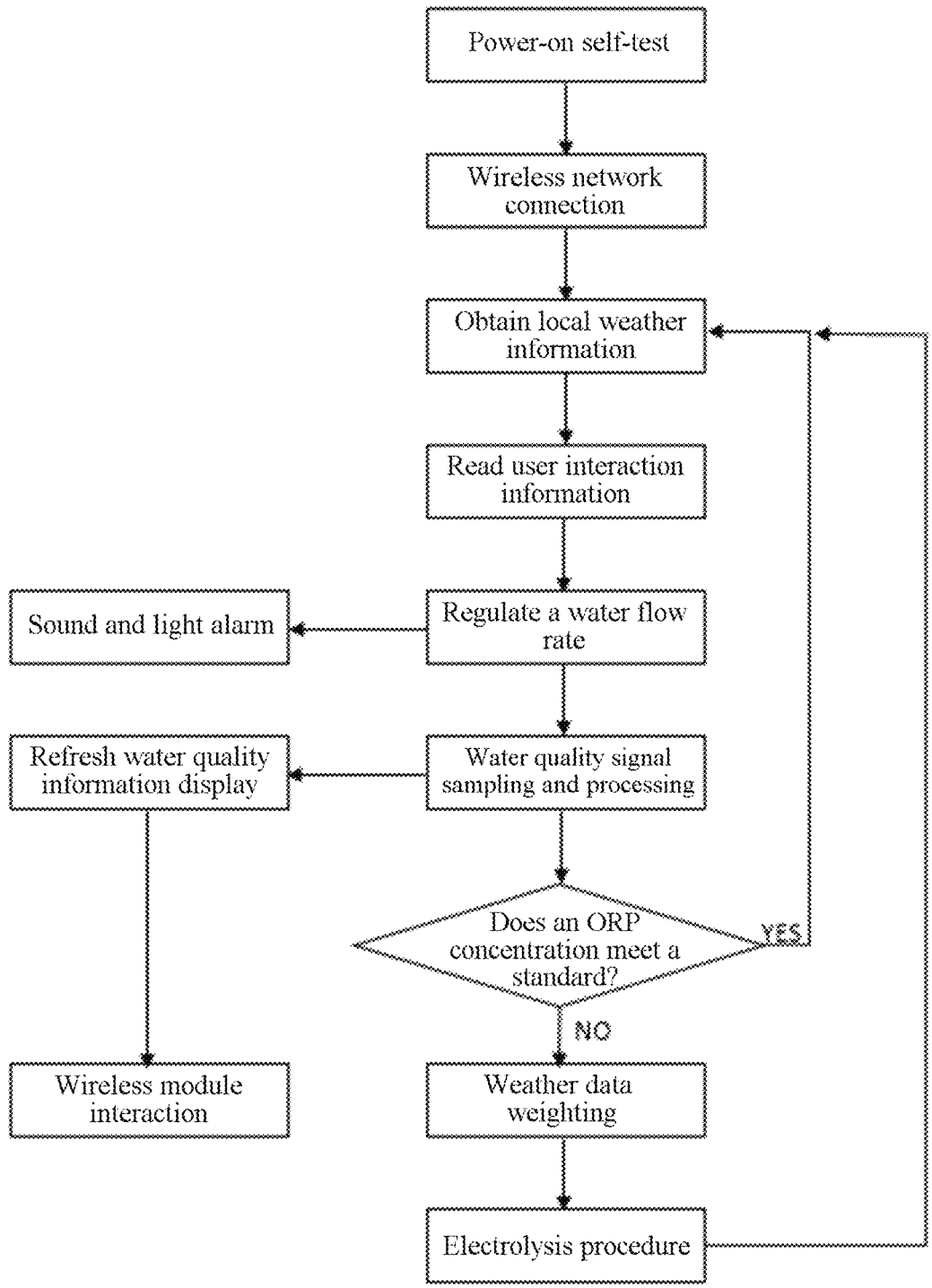
FIG. 2 is a schematic diagram of a control method according to an example.

As shown in FIG. 2, a method for controlling salt chlorine generation, including:

determining, according to a water quality parameter, whether a concentration of a chlorine disinfection constituent in water meets a standard; and if the concentration meets the standard, skipping starting an electrolysis procedure/apparatus; or if the concentration does not meet the standard, automatically controlling a power supply time of the electrolysis apparatus according to a concentration difference value $\Delta_{concentration}$ of the chlorine disinfection constituent; and using a sunshine intensity and an ultraviolet index as weighting values for the power supply time of the electrolysis apparatus according to obtained weather information, comprehensively processing the sunshine intensity and the ultraviolet index, where an obtained weighting value is classified into a plurality of levels, performing weighting based on the power supply time of the electrolysis apparatus, multiplying a weight, and resetting a power supply cycle after a power supply cycle is completed.

In this way, in a weather condition of a weak sunshine intensity or ultraviolet intensity, the power supply time of the electrolysis apparatus may be appropriately reduced every day, and in a weather condition of a strong sunshine intensity or ultraviolet intensity, the power supply time of the electrolysis apparatus may be appropriately increased, so that the service life of the salt chlorine generator can be greatly extended.

In an entire electrolysis process, the concentration of the chlorine disinfection constituent is periodically obtained, and when the concentration difference value $\Delta_{concentration}$ of the chlorine disinfection constituent is zero, the concentration of the chlorine disinfection constituent meets the standard, and the electrolysis procedure/apparatus is stopped.

In the present example, each power supply cycle of the electrolysis apparatus is set to six hours, and a time t for which a control board controls power supply to the electrolysis apparatus in each cycle is $6*\Delta_{concentration}/m$, and m is 4.2.

In the present example, six levels are set, and weighting values are respectively [1.0, 1.1, 1.2, 1.3, 1.4, 1.5]. In other words, for a level 1, the weighting value is 1.0, and for a level 4, the weighting value is 1.3.

Example 2

A system for controlling salt chlorine generation, including:
- a data obtaining module, configured to obtain a water quality parameter and climate data;
- a control module, configured to determine, according to the water quality parameter, whether a concentration of a chlorine disinfection constituent in water meets a standard; and if the concentration meets the standard, skip starting an electrolysis apparatus/procedure; or if the concentration does not meet the standard, start the electrolysis apparatus/procedure, and calculate a power supply time of the electrolysis apparatus according to a concentration difference value of the chlorine disinfection constituent, to form a control instruction;
- a weighting module, configured to determine a weighting value according to the climate data, to fine-tune the control instruction; and
- an execution module, configured to control the electrolysis apparatus by using the fine-tuned control instruction.

Example 3

A control board/controller includes a memory, a processor, and computer instructions that are stored in the memory and are run on the processor, where the computer instructions, when being processed by the processor, complete the steps in the method provided in Example 1.

The control board/controller is connected to a data obtaining module. The data obtaining module is configured to obtain a water quality parameter and climate data, and includes a concentration detection module for a chlorine disinfection constituent and a sunshine intensity and ultraviolet index detection module.

Example 4

A salt chlorine generator uses the control method in Example 1 or includes the system in Example 2 or the control board/controller in Example 3.

Example 5

A salt chlorine generator includes an execution part, a control part, and an interaction part.

Figure 3:
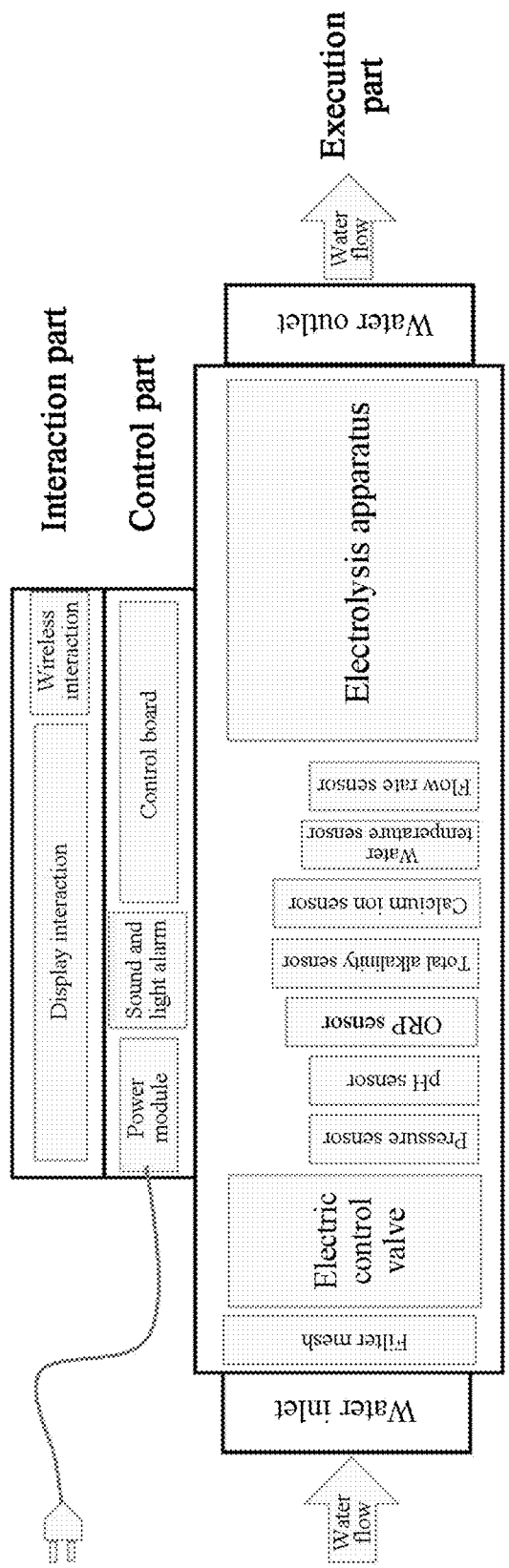
FIG. 3 is a schematic structural cross-sectional view of a salt chlorine generator according to an example.

As shown in FIG. 3, the execution part includes a sealed housing, an electrolysis apparatus, an electric control valve, and a detection assembly. In the present example, the detection assembly includes a pressure sensor, a flow rate sensor, a pH sensor, an ORP sensor (configured to test an oxidation-reduction potential, so that water quality sanitary indicators of a swimming pool may be obtained), a total alkalinity sensor (total alkalinity assists in stabilizing a pH value), a calcium ion sensor, and a water temperature sensor. The execution part is responsible for sampling of various signals, regulation of a water flow rate, and electrolysis.

The control part includes a power source, a sound and light alarm device, and a control board/controller. The control board/controller is responsible for sampling and processing of various sensor data, power supply of the electrolysis apparatus, and control of the electric control valve.

The interaction part includes a touch screen display interface and a wireless interaction module, and may be connected to a user terminal by operating on the touch screen display or a wireless module (including, but not limited to, Bluetooth, Wi-Fi, and Zigbee) to express various parameter information (including, but not limited to, a concentration of a chlorine disinfection constituent, a pH value, total alkalinity, a concentration of calcium ions, a water temperature, and a real-time water flow rate of swimming pool water). The control board may be connected to a wireless network by the wireless module to obtain weather data (including, but not limited to, a sunshine intensity, and an ultraviolet intensity), and automatically regulates a running time of the electrolysis apparatus according to the weather data.

As shown in FIG. 3, in the present example, the execution part is a sealed cabin having a water inlet and a water outlet provided with sealing interface male threads, and is linked to a circulation pipe of a swimming pool of the user by sealing interface female connectors. A filter mesh is designed at the water inlet and may filter out fine grit. The filter mesh may protect subsequent devices such as a sensor part and the electrolysis apparatus from scratching by grit.

The electric control valve is provided following the filter mesh. The electric control valve receives a PWM control signal of the control board, and regulates an opening degree of the valve according to duty cycle information of the PWM control signal, to ensure that a flow rate of water flowing through the salt chlorine generator is controllable.

Various sensors are provided following the electric control valve. These sensors are powered by the control board, and transmit acquired voltage or current signals to the control board for the control board to uniformly perform operation and processing. The electrolysis apparatus of the salt chlorine generator is provided following the sensors, and is powered and directly controlled to be turned on or off by the control board. When the control board supplies power, electrolysis starts, and when the control board performs control to cut off power, electrolysis stops. The control board detects an operating current of the electrolysis apparatus, and measures a real-time salt concentration value of swimming pool water in combination with a water temperature. The value participates in the control of the electrolysis apparatus as an important parameter. Water flows through the electrolysis apparatus for electrolysis and flows out from the water outlet to deliver the chlorine disinfection constituent into a circulation pipeline of the swimming pool.

The control board, a power module, the sound and light alarm device, the touch screen display, and the wireless interaction module are included in the cabin. 110-VAC or 220-VAC utility power is converted by the power module into 32-V direct current power to be supplied to the control board. The sound and light alarm device is powered under direct control by the control board through a relay. When triggering includes, but not limited to, an excessive pressure in a water pipe, an excessively high pH value, an abnormal water temperature, among other alarm information, the controller controls the sound and light alarm device to set off an alarm. The alarm is turned off through control by the user through operating on the touch screen display or using a wireless terminal.

Figure 4:
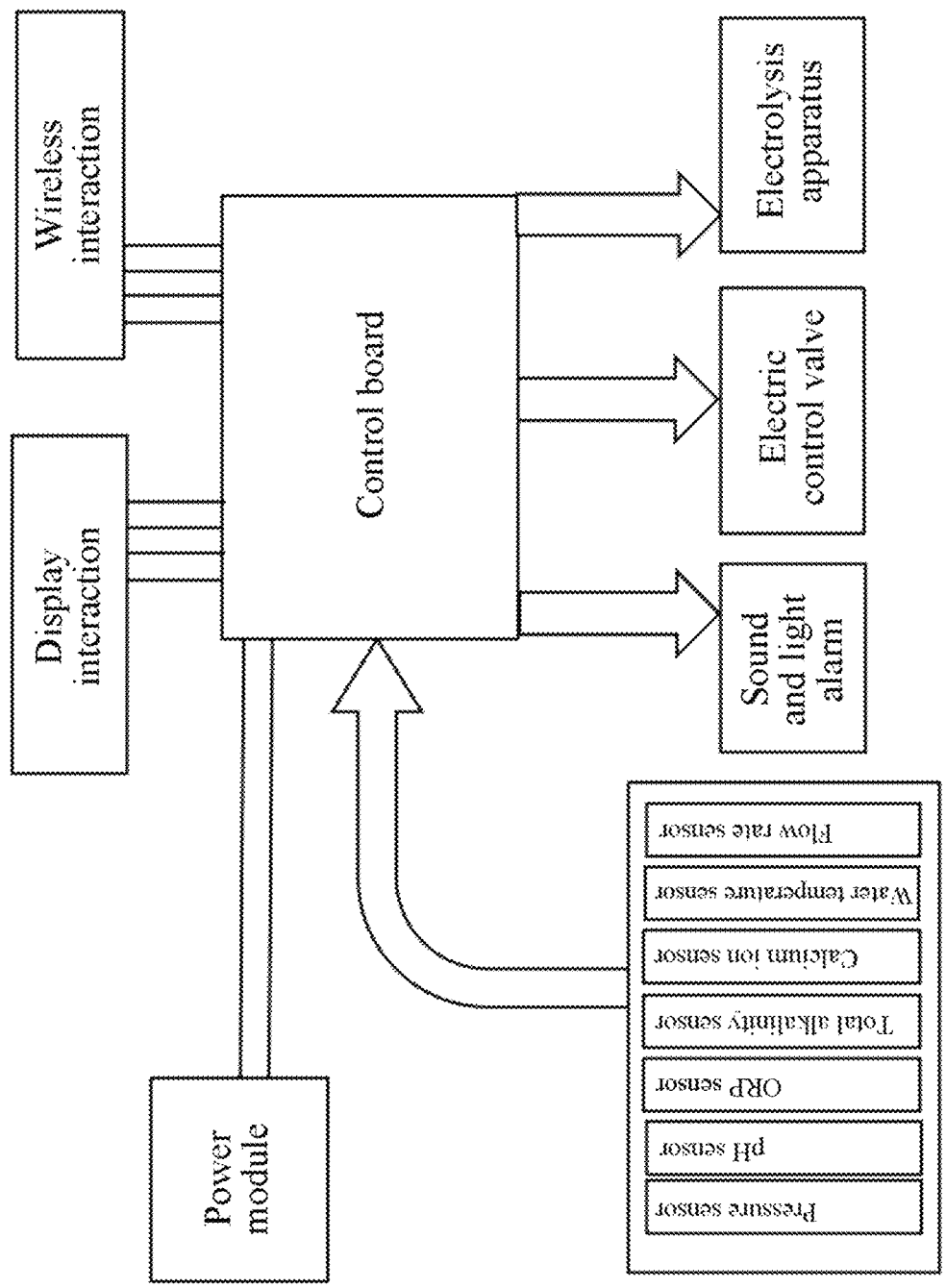
FIG. 4 is a schematic diagram of composition of a salt chlorine generator according to an example.

As shown in FIG. 4, the control board controls, according to running parameters set through operating on the touch screen display or the wireless terminal and a control start signal and signal inputs of the pressure sensor, the pH sensor, the ORP sensor, the total alkalinity sensor, the calcium ion sensor, the water temperature sensor, and the flow rate sensor, power supply of the electrolysis apparatus, the opening degree of the electric control valve, and information alarming of the sound and light alarm device to ensure the normal operation of the salt chlorine generator.

After the salt chlorine generator is powered on, the control board is reset and performs a self-test procedure, to first determine that the signal inputs of the pressure sensor, the pH sensor, the ORP sensor, the total alkalinity sensor, the calcium ion sensor, the water temperature sensor, and the flow rate sensor are normal, thereby ensuring correct reading of water quality information.

After the self-test procedure is completed, connection to the wireless network is performed. After the connection is completed, local weather data (including, but not limited to, a sunshine intensity, an ultraviolet index, sunny/rainy weather, among other information) is automatically obtained, to make good preparation for control of a subsequent electrolysis procedure.

After receiving parameter information set by the user through the interaction module, the control board starts to operate according to the parameter information, first reads a value of the pressure sensor, reduces the opening degree of the electric control valve if the pressure is excessively large to reduce a water flow rate, thereby ensuring the safety of the circulation pipeline, increases the opening degree of the electric control valve if the pressure is excessively small to increase the water flow rate, and if the opening degree of the electric control valve already reaches a maximum but the pressure is still insufficient, notifies the user through a sound and light alarm or the interaction module to increase the power of the circulating water pump.

After the adjustment of the water pressure is completed, a sampling and processing procedure of a water quality signal is entered. Voltage or current signals (analog quantities or digital quantities) of the pressure sensor, the pH sensor, the ORP sensor, the total alkalinity sensor, the calcium ion sensor, the water temperature sensor, and the flow rate sensor are first read in sequence. The voltage or current signals are operated and converted into actual physical quantity parameters and expressed to the user through the interaction part, and abnormal data may be specially labeled for reference of real-time water quality information by the user.

In the present example, the control board obtains a water oxidation-reduction potential measured value (unit: mV) of a swimming pool according to the ORP sensor in the system, and may set a threshold of the value in the procedure, and determine, by comparing the threshold and the measured value to determine a difference, to determine whether the concentration of the chlorine disinfection constituent in water meets a standard. If the concentration meets the standard, the electrolysis procedure does not need to be started. If the concentration does not meet the standard, the control board automatically controls a power supply time of the electrolysis apparatus according to a concentration difference value $\Delta_{concentration}$ of the chlorine disinfection constituent. Each power supply cycle of the electrolysis apparatus is set to six hours, and a time t for which the control board controls power supply to the electrolysis apparatus in each cycle is $6*\Delta_{concentration}/4.2$.

The control board processes weather information obtained by the wireless module, and uses a sunshine intensity and an ultraviolet index as weighting values for the power supply time of the electrolysis apparatus. The control board comprehensively processes the sunshine intensity and the ultraviolet index. An obtained sunshine intensity is divided into n levels, to which values 1.0 to 1.n are assigned respectively, m ultraviolet levels are included, to which values 1.0 to 1.m are assigned respectively, and a manner for calculating a final weighting value is 1.a*1.b, where $0 \leq a \leq n$, and $0 \leq b \leq m$.

An obtained weighting value may be classified into four or more levels. The foregoing power supply time of the electrolysis apparatus is multiplied by the final weighting value greater than or equal to 1 or weighting values after the classification of levels. A power supply cycle is reset after a power supply cycle is completed. That is, a power supply cycle of six hours is restarted.

In an entire electrolysis process, the control board periodically reads the concentration of the chlorine disinfection constituent, and when the concentration difference value $\Delta_{concentration}$ of the chlorine disinfection constituent is zero, the concentration of the chlorine disinfection constituent meets the standard, and the control board stops the electrolysis procedure.

In the foregoing examples, value setting of specific parameters, selection of modules, or model selection may be adjusted or selected according to specific cases, and details are not described herein.

A person skilled in the art should understand that the embodiments of the present invention may be provided as a method, a system, or a computer program product. Therefore, the present invention may use a form of hardware-only embodiments, software-only embodiments, or embodiments with a combination of software and hardware. In addition, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or another programmable device provides steps for implementing a specific function in one or more processes in the flowcharts and/or in one or more blocks in the block diagrams.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A method for controlling salt chlorine generation, comprising:
   obtaining a water quality parameter and climate data;
   determining, according to the water quality parameter, whether a concentration of a chlorine disinfection constituent in water meets a standard; and, if the concentration meets the standard, skipping starting an electrolysis apparatus/procedure; or if the concentration does not meet the standard, starting the electrolysis apparatus/procedure, and calculating a power supply time of the electrolysis apparatus according to a concentration difference value of the chlorine disinfection constituent, to form a control instruction;
   determining a weighting value according to the climate data, to fine-tune the control instruction; and
   controlling the electrolysis apparatus by using the fine-tuned control instruction;
   wherein, the climate data comprises a sunshine intensity and an ultraviolet index;
   wherein the calculation of the power supply time of the electrolysis apparatus according to the concentration difference value of the chlorine disinfection constituent, comprises: within each power supply cycle, the power supply time t of the electrolysis apparatus is $N*\Delta_{concentration}/m$, wherein N is a total duration of the power supply cycle, m is a preset parameter less than N, and $\Delta_{concentration}$ is the concentration difference value of the chlorine disinfection constituent; and
   wherein the determination of the weighting value according to the climate data, comprises: comprehensively processing the sunshine intensity and the ultraviolet index, classifying obtained weighting values into a plurality of levels, and adding the weighting value within a set range to the power supply time corresponding to the control instruction.

2. The method for controlling salt chlorine generation according to claim 1, wherein the water quality parameter comprises a water oxidation-reduction potential measured value.

3. The method for controlling salt chlorine generation according to claim 1, wherein the determination of whether the concentration of the chlorine disinfection constituent in water meets the standard according to the water quality parameter comprises: obtaining a water oxidation-reduction potential measured value; comparing the measured value with a preset threshold; and, determining, if the measured value is less than the threshold, that the concentration of the chlorine disinfection constituent in the water does not meet the standard.

4. The method for controlling salt chlorine generation according to claim 1, wherein the set range is [1.0, . . . , 1.a], a is greater than 0, a quantity of the levels is b, the set range is divided at intervals of (a+1)/10b, and a weight of an $i^{th}$ level is 1.0+(a+1)(i−1)/10b.

5. The method for controlling salt chlorine generation according to claim 1, wherein the concentration of the chlorine disinfection constituent is periodically obtained, and when the concentration difference value $\Delta_{concentration}$ of the chlorine disinfection constituent is zero, the concentration of the chlorine disinfection constituent meets the standard, and the electrolysis apparatus is stopped.

6. The method for controlling salt chlorine generation according to claim 1, wherein an obtained sunshine intensity is divided into n levels, to which values 1.0 to 1.n are assigned respectively, ultraviolet levels comprises m levels, to which values 1.0 to 1.m are assigned respectively, a manner for calculating a final weighting value is 1.a*1.b, 0≤a≤n, 0≤b≤m, and the power supply time of the electrolysis apparatus is multiplied by the final weighting value.

7. A salt chlorine generator comprising a controller configured to control the salt chlorine generator according to the control method of claim 1.

8. The salt chlorine generator according to claim 7, wherein the salt chlorine generator further comprises a detection assembly; the detection assembly comprises several of the following modules:
   a pressure sensor, configured to detect a pressure of liquid;
   a pH sensor, configured to detect a pH value of liquid;
   an Oxidation-Reduction Potential (ORP) sensor, configured to detect an oxidation-reduction potential of liquid;
   a total alkalinity sensor, configured to detect total alkalinity of liquid;
   a calcium ion sensor, configured to detect calcium ions in liquid;
   a water temperature sensor, configured to detect a temperature of liquid; and
   a flow rate sensor, configured to detect a flow rate of liquid.

9. The salt chlorine generator according to claim 8, wherein a front end and a rear end of the salt chlorine generator are respectively connected to a pipe by interfaces, and at an inlet of the connected pipe, a filter mesh is disposed, and an electric control valve is disposed, to control an opening degree of the pipe, and water flows through an electrolysis apparatus for electrolysis and flows out from an water outlet to deliver a chlorine disinfection constituent into the pipe.

10. The salt chlorine generator according to claim 9, wherein the controller is configured to compare a detected pressure of liquid with a preset upper pressure limit and lower pressure limit, wherein if the pressure of liquid is greater than the preset upper pressure limit, the opening degree of the electric control valve is reduced; if the pressure is less than the preset lower pressure limit, the opening degree of the electric control valve is increased; and, if the opening degree of the electric control valve already reaches a maximum but the pressure is still less than the preset lower pressure limit, early-warning information is sent to indicate that power of a circulating water pump in the pipe is to be increased; and
   the controller is connected to the detection assembly and an interaction module.

11. A system for controlling salt chlorine generation, comprising:
   a data obtaining module, configured to obtain a water quality parameter and climate data;
   a control module, configured to determine, according to the water quality parameter, whether a concentration of a chlorine disinfection constituent in water meets a standard; and if the concentration meets the standard, skip starting an electrolysis apparatus/procedure; or if the concentration does not meet the standard, start the electrolysis apparatus/procedure, and calculate a power supply time of the electrolysis apparatus according to a concentration difference value of the chlorine disinfection constituent, to form a control instruction; wherein, the control module is configured to perform the calculation of the power supply time of the electrolysis apparatus according to the concentration difference value of the chlorine disinfection constituent by calculating the power supply time t of the electrolysis apparatus within each power supply cycle according to $N*\Delta_{concentration}/m$, wherein N is a total duration of the power supply cycle, m is a preset parameter less than N, and $\Delta_{concentration}$ is the concentration difference value of the chlorine disinfection constituent;

a weighting module, configured to determine a weighting value according to the climate data, to fine-tune the control instruction; wherein, the weighting module is configured to perform the determination of the weighting value according to the climate data by comprehensively processing a sunshine intensity and an ultraviolet index, classifying obtained weighting values into a plurality of levels, and adding the weighting value within a set range to the power supply time corresponding to the control instruction; and an execution module, configured to control the electrolysis apparatus by using the fine-tuned control instruction;

wherein, the climate data comprises the sunshine intensity and the ultraviolet index.

12. A salt chlorine generator, comprising the control system according to claim 11.

13. The salt chlorine generator according to claim 12, wherein the salt chlorine generator further comprises a detection assembly; the detection assembly comprises several of the following modules:

a pressure sensor, configured to detect a pressure of liquid;
a pH sensor, configured to detect a pH value of liquid;
an Oxidation-Reduction Potential (ORP) sensor, configured to detect an oxidation-reduction potential of liquid;
a total alkalinity sensor, configured to detect total alkalinity of liquid;
a calcium ion sensor, configured to detect calcium ions in liquid;
a water temperature sensor, configured to detect a temperature of liquid; and
a flow rate sensor, configured to detect a flow rate of liquid.

14. The salt chlorine generator according to claim 13, wherein a front end and a rear end of the salt chlorine generator are respectively connected to a pipe by interfaces, and at an inlet of the connected pipe, a filter mesh is disposed, and an electric control valve is disposed, to control an opening degree of the pipe, and water flows through an electrolysis apparatus for electrolysis and flows out from an water outlet to deliver a chlorine disinfection constituent into the pipe.

15. The salt chlorine generator according to claim 14, wherein the salt chlorine generator further comprises a controller, the controller is configured to compare a detected pressure of liquid with a preset upper pressure limit and lower pressure limit, wherein if the pressure of liquid is greater than the preset upper pressure limit, the opening degree of the electric control valve is reduced; if the pressure is less than the preset lower pressure limit, the opening degree of the electric control valve is increased; and, if the opening degree of the electric control valve already reaches a maximum but the pressure is still less than the preset lower pressure limit, early-warning information is sent to indicate that power of a circulating water pump in the pipe is to be increased; and the controller is connected to the detection assembly and an interaction module.

* * * * *